May 2, 1961  J. F. BELL  2,982,416
DIALYSIS APPARATUS
Filed April 25, 1957

INVENTOR
JAMES F. BELL,
BY Larson and Taylor
ATTORNEYS

United States Patent Office 2,982,416
Patented May 2, 1961

2,982,416

DIALYSIS APPARATUS

James F. Bell, Baltimore, Md., assignor to Marvaland, Incorporated, Westminster, Md., a corporation of Maryland Filed Apr. 25, 1957, Ser. No. 655,147

4 Claims. (Cl. 210—321)

The present invention relates to an apparatus which is useful in connection with dialysis or filtering operations. More particularly, the invention disclosed herein provides a means for obtaining an extremely large surface area in a comparatively small volume and is useful wherever the need arises for large surface areas, for example, in connection with diffusion or filtering devices.

Heretofore there have been a considerable number of devices of varying types constructed to provide for dialysis and filtering operations. The problem is, of course, to provide a maximum surface area so as to permit the fluid to have contact with the semi-permeable membrane or filter to as large an extent as possible. Obviously, this can be achieved by using devices having a large surface area in a considerable volume but the art has long sought for a device having equivalent surface area in a reduced volume.

In the present invention plastic sheets of the order of one thousandth of an inch thick are grooved on one surface. This grooving may be applied by any well known technique such as, for example, by passing the plastic preheated material through two rollers on one of which is a tread of the desired contour. The tread size may be such that grooves as small as fifty millionths of an inch may be produced. The grooved plastic sheet is cut into small sections and these sections may be stacked.

In one embodiment wherein the apparatus is used for diffusion purposes, the grooved sheets of material are stacked with the grooves of each successive sheet disposed angularly with respect to the sheet below it. Thus a stack of grooved sheets is provided with grooves in one set of alternate sheets extending in one direction and the grooves in the other set of alternate sheets extending in a different direction. Subsequently the corners of the sheets are sealed together in any convenient manner, as for example, heat sealing so as to prevent leakage and the stack is placed in a container having ports in four sides thereof to form two passageways extending at the same angle with respect to each other as the sets of grooved sheets. One fluid may be passed through one set of grooves and another fluid through the other set, diffusion occurring through the then grooved sheets. Due to the extremely small groove size in the plastic sheets and the large number of sheets which can be stacked in a small volume an extremely large surface area may be provided in a comparatively small volume. In one embodiment of the present invention diffusion areas of over five thousand square feet may be produced in a volume of one cubic foot.

An object of the present invention is to provide an apparatus for obtaining a large surface area for diffusion or filtration in a comparatively small volume.

Another object of the present invention is to provide a dialysis or filtering apparatus comprising a plurality of stacked grooved sheets of semi-permeable material.

Other objects and many of the attendant advantages of the present invention will become apparent upon consideration of the following detailed specification in connection with the accompanying drawing wherein.

Figure 1:
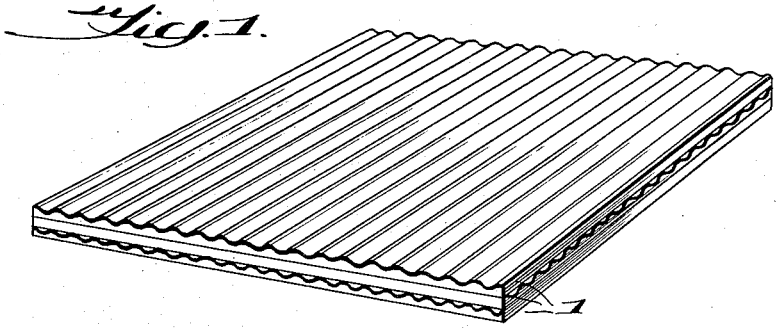
Fig. 1 is a perspective view of a plurality of grooved sheets arranged to form a dialysis apparatus.

Referring now more specifically to the drawing, there is shown at 1 a section of a sheet of material having grooves disposed in one surface thereof. The material used may be of a plastic such as, for example, polyethylene, and sheets as thin as one-thousandth of an inch may be employed. The grooves may be embossed in the surface by heating the plastic material and passing it between two rollers upon one of which is a tread of the desired contour. The tread on the roller may be formed by techniques used in connection with diffraction gratings in which as high as thirty thousand lines to the inch are obtained. Techniques for forming diffraction gratings are known in the art and are disclosed, for example, in the Journal of the Optical Society of America, vol. 41, No. 1, pages 3 thru 15. Thus, it can be seen that the grooves in the plastic material may be microscopic in size and it is within the realm of the invention to provide hole sizes as small as fifty millionths of an inch in diameter.

After the sheet of material has been embossed with grooves, it may be cut into sections such as shown at 1 in Fig. 1. The sections of material are then stacked with the grooves of one set of alternate sheets extending in one direction and the grooves of the other set of alternate sheets extending angularly with respect to the first set. In the example shown the grooves in each successive sheet are disposed at 90° with respect to the sheets above and below but this angle may be varied to suit any operational requirement.

After a large number of these sheets have been stacked in the manner described above, the stack is compressed and portions of each corner of the stack are sealed together. The sealing may be by any convenient process, such as, for example, heat sealing. For example, in a stack of four-inch square sheets approximately one-half inch on each side of each corner is sealed along the entire height of the stack so that three inches of open grooves is left on each side of the stack.

Figure 3:
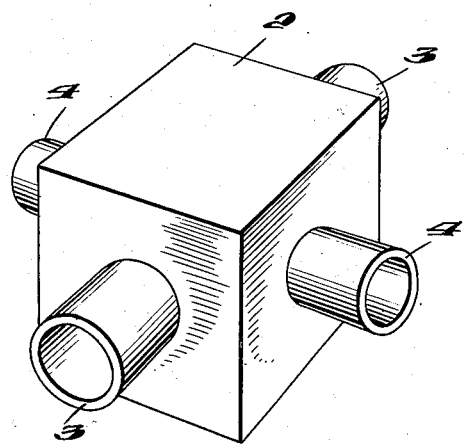
Fig. 3 is a view of one form of container which may be used in the present invention.

The stacked sealed sheets are then enclosed so that the completed structure resembles a container such as shown at 2 in Fig. 3. Ports are provided in the container so that ports 3 in combination with one set of grooved sheets provides one passageway and ports 4 in combination with the other set of grooved sheets provides another independent passageway. In one mode of enclosing the stacked sheets L-shaped corner portions are heat sealed to the stack and subsequently the remaining elements of the container shown in Fig. 3 are applied and secured to the corner portions in any convenient manner. By this method of assembly there is no possibility of fluid leakage around the corners of the stacked sheets although it is to be understood the method of container assembly and the form of container disclosed are illustrative and not limiting.

It can be readily appreciated that one liquid or gas may be passed through the container along one passageway so that the liquid or gas is disposed within the grooves in alternate sheets and a separate gas or liquid may be passed through the other passageway so that it fills the grooves in the other group of alternate sheets. Thus it will be seen that the two liquids or gases are separated from one another only by the thickness of the sheet at the bottom of a groove. Due to the large number of sheets provided and the large number of grooves in each sheet, a tremendous surface area may be effected.

Figure 2:
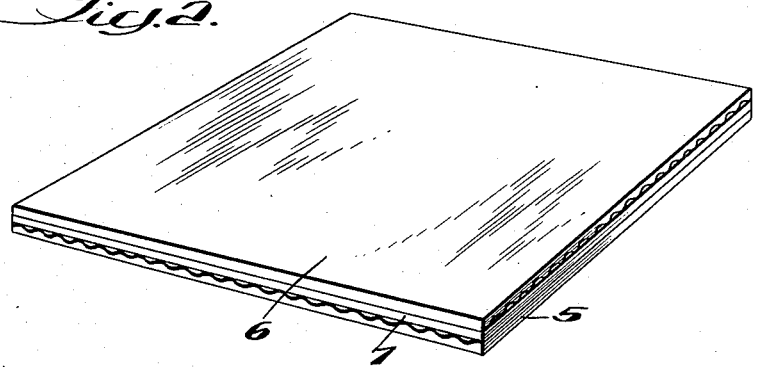
Fig. 2 is a similar view of another embodiment of a dialysis or filtering apparatus.

In Fig. 2 there is disclosed an arrangement in which the grooved sheets 5 and 6 are arranged with the grooved surfaces opposed to one another and disposed at 90° with respect to each other. It is obvious that the angular relationship of the sheets is not critical and can be suitably varied. An ungrooved sheet of material 7 is disposed between each pair of grooved sheets. This sheet may be of the same material as the grooved sheets so that a diffusion of fluids may be effected therethrough or the sheet may be of filtering or screening material so that particles may be passed through the screening, the device acting as a filter. This arrangement may be assembled within a container such as shown in Fig. 3 in a manner identical to that previously described and will function either as a dialysis device or a filter depending on the nature of sheet 7.

The apparatus described has numerous uses, one use which has proven eminently successful is as an artificial lung. Blood may be passed through the apparatus in one direction and oxygen in the other and oxygenation of the blood by diffusion will be effected. Oxygenation as high as 83% has already been achieved and it is anticipated that venous blood of 60% oxygenation may be brought up to 90% oxygenation. The success in this field may be attributed to the small groove size. Blood corpuscles are of the order of eight microns in size and it is particularly desirable to bring the diffusion chamber size down to the corpuscle size as nearly as possible so that the oxygen need only diffuse through the chamber wall to reach the corpuscle rather than through a body of plasma as well. It is also contemplated that the chamber walls may be coated or impregnated with a substance such as a phosphate or sulphate which will oppose the negative valence of the corpuscles and thus prevent adherence of the corpuscles on the chamber walls.

The presently disclosed dialysis apparatus is particularly well suited to the handling of slurries or problems involving the transport of particles in a fluid where a chemical reaction with the particles is desired either through a method of diffusion or filtration. The device may be applied for water purification in the field of sanitary engineering, particularly with respect to the removing of ions and also has use in connection with the problem of removing salt from water. Broadly stated, the apparatus has use in connection with any application of a dialysis device or in microfiltering operation where large surface area and small volume are considerations.

Obviously, many modifications and variations of the present invention are possible in the light of the foregoing teachings. What is claimed as new and desired to be secured by Letters Patent is:

1. A dialysis apparatus comprising a plurality of sheets of semipermeable material, said sheets being arranged in a stack in surface to surface contact, said sheets having parallel microscopic grooves therein in the order of several thousand per inch, the grooves in the stacked sheets forming flow paths through the apparatus, the flow path formed by the parallel grooves in one sheet being angularly disposed with respect to the flow path formed by the parallel grooves in an adjacent sheet, the semipermeable sheets separating the flow paths.

2. An apparatus comprising a plurality of sheets of material each sheet having parallel microscopic grooves in the order of several thousand per inch in the surface thereof, the sheets being disposed in a stack in pairs with the grooved surfaces in adjacent sheets being disposed in facing relation, each said pair of sheets being separated by a membrane, the flow path formed by the parallel grooves in one sheet being angularly disposed with respect to the flow path formed by the parallel grooves in an adjacent sheet.

3. A dialysis apparatus for providing large surface area in a small volume, said apparatus comprising a plurality of sheets of semipermeable material arranged in a stack, said sheets being grooved on the surface thereof, the grooves being parallel and microscopic and in the order of several thousand per inch, grooves on adjacent sheets being separated by the semipermeable sheet, the flow path formed by the parallel grooves in one sheet being angularly disposed with respect to the flow path formed by the parallel grooves in an adjacent sheet, grooves on alternate sheets extending in the same direction whereby a pair of flow paths through the stacked sheets is provided, portions of the edges of the stacked sheets being sealed together.

4. A dialysis apparatus comprising a plurality of sheets of semipermeable plastic material, each sheet having a thickness in the order of one thousandth of an inch, said sheets being arranged in a stack in surface to surface contact, said sheets having parallel microscopic grooves therein in the order of several thousand per inch, the grooves in the stacked sheets forming independent flow paths through the apparatus, the flow path formed by the parallel grooves in one sheet being angularly disposed with respect to the flow path formed by the parallel grooves in an adjacent sheet, portions of the edges of the stacked sheets being sealed together, a container, said stacked sheets being disposed within said container and said container having ports in four faces thereof to cooperate with said flow paths through the stacked sheets to form a pair of passageways.

References Cited in the file of this patent

UNITED STATES PATENTS

| | | |
|---|---|---|
| 2,569,243 | Kovacs | Sept. 25, 1951 |
| 2,618,357 | Harlow | Nov. 18, 1952 |
| 2,686,154 | MacNeill | Aug. 10, 1954 |
| 2,735,812 | Van Hoek | Feb. 21, 1956 |
| 2,756,206 | Gobel | July 24, 1956 |

FOREIGN PATENTS

| | | |
|---|---|---|
| 693,495 | Great Britain | July 1, 1953 |

OTHER REFERENCES

The Lancet, vol. 11, 1956, No. 25, page 1277, Dec. 22, 1956.